No. 828,505. PATENTED AUG. 14, 1906.
W. T. RICE.
FISH HOOK.
APPLICATION FILED FEB. 23, 1906.

WITNESSES:
E. F. Stewart
R. M. Elliott

William T. Rice,
INVENTOR,
By C. A. Snow & Co.
ATTORNEYS.

THE NORRIS PETERS CO., WASHINGTON, D. C.

UNITED STATES PATENT OFFICE.

WILLIAM T. RICE, OF BERLIN, OKLAHOMA TERRITORY.

FISH-HOOK.

No. 828,505. Specification of Letters Patent. Patented Aug. 14, 1906.

Application filed February 23, 1906. Serial No. 302,562.

*To all whom it may concern:*

Be it known that I, WILLIAM T. RICE, a citizen of the United States, residing at Berlin, in the county of Roger Mills, Oklahoma Territory, have invented a new and useful Fish-Hook, of which the following is a specification.

This invention relates to fish-hooks.

The object of the invention is to provide a fish-hook having a novel form of barb which in addition to performing the usual function of retaining a fish upon the hook will also perform the further function of a knife to free the hook from the fish, whereby the necessity of employing a knife for the purpose, as is frequently rendered necessary, is entirely obviated.

With the above and other objects in view, as will appear as the nature of the invention is better understood, the same consists in the novel form of fish-hook hereinafter fully described and claimed.

Figure 1:
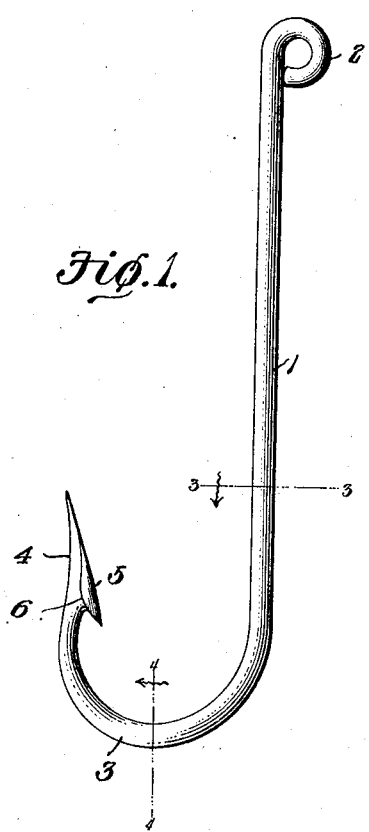
Figure 2:
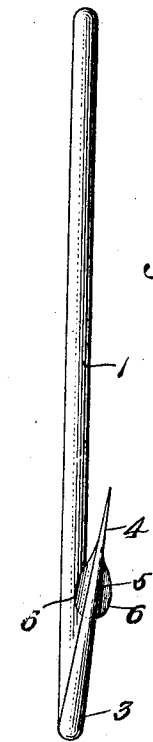
Figure 3:
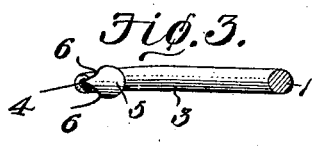
Figure 4:
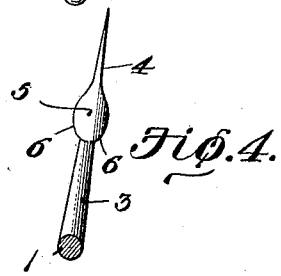

In the accompanying drawings, forming a part of this specification and in which like characters of reference indicate corresponding parts, Figure 1 is a view in side elevation of a fish-hook constructed in accordance with the present invention. Fig. 2 is an edge view taken from the front of the hook. Fig. 3 is a horizontal sectional view taken on the line 3 3, Fig. 1, and looking in the direction of the arrow thereon. Fig. 4 is a vertical sectional view taken on the line 4 4, Fig. 1, and looking in the direction of the arrow thereon.

The hook, as usual, comprises a shank 1, an eye 2, and bill 3, terminating in a point 4, and as these parts may be of the usual or any preferred construction further description thereof is deemed unnecessary.

The gist of the present invention resides in the novel form of barb 5, which, as before stated, is adapted to perform the dual functions of holding a fish upon the hook and the freeing of the hook from engagement with the fish. As shown in Fig. 3, the barb is curved in cross-section, and when viewed in elevation is ovate-acuminate in form and merges into the point in such manner as to form a continuation thereof. The margin or edge 6 of the barb is sharpened and forms cutting edges that when lateral motion accompanied with downward pressure is applied to it will operate to cut the barb 3 from the fish.

By having the barb transversely curved the cutting edges at its sides are disposed relatively close to the point and will therefore not be apt to injure an angler in an attempt to bait the hook, which might result if the barb were straight in cross-section with the edges disposed at right angles to the point instead of being disposed approximately in parallelism therewith.

The improvements herein defined while simple in character will be found thoroughly efficient for the purpose designed and will operate to overcome an objectionable feature common with large fish-hooks—namely, the trouble of extracting a hook from the mouth of a fish.

I claim—

1. A fish-hook having a barb constituting a knife.

2. A fish-hook having a transversely-curved barb.

3. A fish-hook having a marginally-edged transversely-curved ovate-acuminate barb.

4. A fish-hook having an ovate-acuminate barb the edges of which project laterally beyond the point and constitute knives.

5. A fish-hook having a barb formed with marginal cutting edges.

In testimony that I claim the foregoing as my own I have hereto affixed my signature in the presence of two witnesses.

WILLIAM T. RICE.

Witnesses:
  N. B. BURNS,
  D. A. HALBROOK.